(12) United States Patent
Shi

(10) Patent No.: US 10,957,305 B2
(45) Date of Patent: Mar. 23, 2021

(54) METHOD AND DEVICE FOR INFORMATION PROCESSING

(71) Applicant: Lenovo (Beijing) Co., Ltd., Beijing (CN)

(72) Inventor: Weixing Shi, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 15/625,496

(22) Filed: Jun. 16, 2017

(65) Prior Publication Data

US 2018/0005624 A1 Jan. 4, 2018

(30) Foreign Application Priority Data

Jun. 29, 2016 (CN) .......................... 201610503207.X

(51) Int. Cl.
| | | |
|---|---|---|
| *G10L 15/16* | (2006.01) | |
| *G10L 15/01* | (2013.01) | |
| *G10L 15/065* | (2013.01) | |
| *G10L 15/02* | (2006.01) | |
| *G10L 15/22* | (2006.01) | |
| *G10L 15/30* | (2013.01) | |

(52) U.S. Cl.
CPC .............. *G10L 15/01* (2013.01); *G10L 15/02* (2013.01); *G10L 15/065* (2013.01); *G10L 15/22* (2013.01); *G10L 15/30* (2013.01); *G10L 15/16* (2013.01)

(58) Field of Classification Search
CPC ..................................................... G10L 15/16
See application file for complete search history.

(56) References Cited

U.S. PATENT DOCUMENTS

| 5,845,047 | A | 12/1998 | Fukada et al. | |
|---|---|---|---|---|
| 6,990,496 | B1* | 1/2006 | McGee, III | G06K 9/62 |
| 2014/0039888 | A1* | 2/2014 | Taubman | G10L 15/183 |
| | | | | 704/235 |
| 2014/0257803 | A1* | 9/2014 | Yu | G10L 15/16 |
| | | | | 704/232 |
| 2015/0039299 | A1* | 2/2015 | Weinstein | G10L 15/16 |
| | | | | 704/202 |
| 2015/0269937 | A1* | 9/2015 | Jitkoff | G10L 15/20 |
| | | | | 704/235 |

FOREIGN PATENT DOCUMENTS

| CN | 1659624 | A | 8/2005 |
|---|---|---|---|
| CN | 101183525 | A | 5/2008 |
| CN | 101233741 | A | 7/2008 |
| CN | 103039064 | A | 4/2013 |
| CN | 104040480 | A | 9/2014 |
| CN | 104240703 | A | 12/2014 |
| CN | 104509079 | A | 4/2015 |
| CN | 104575493 | A | 4/2015 |
| CN | 105448292 | A | 3/2016 |
| CN | 105556593 | A | 5/2016 |

\* cited by examiner

*Primary Examiner* — Feng-Tzer Tzeng
(74) *Attorney, Agent, or Firm* — Anova Law Group, PLLC

(57) ABSTRACT

An information processing method and an electronic device are provided. The method includes: obtaining audio data collected by a slave device; obtaining contextual data corresponding to the slave device; and obtaining a recognition result of recognizing the audio data based on the contextual data. The contextual data characterizes a voice environment of the audio data collected by the slave device.

18 Claims, 3 Drawing Sheets

METHOD AND DEVICE FOR INFORMATION PROCESSING

CROSS-REFERENCES TO RELATED APPLICATIONS

This application claims the priority of Chinese patent application No. 201610503207.X, filed on Jun. 29, 2016, the entire content of which is incorporated herein by reference.

FIELD OF THE DISCLOSURE

The present disclosure relates to the field of information processing technologies and, more particularly, relates to methods and devices for information processing.

BACKGROUND

With development of information technology, voice recognition may be conducted on electronic devices and thus to control the electronic devices.

Conventional voice recognition often requires users to provide standard pronunciation for the electronic device to recognize. Otherwise, low recognition accuracy may occur and voice recognition may fail. It is desirable to improve recognition accuracy.

The disclosed methods and devices for information processing are directed to solve one or more problems set forth above and other problems in the art.

BRIEF SUMMARY OF THE DISCLOSURE

One aspect of the present disclosure provides a method. The method includes: obtaining, using a processor, audio data collected by a slave device; obtaining, using the processor, contextual data corresponding to the slave device; and obtaining, using the processor, a recognition result of recognizing the audio data based on the contextual data characterizing a voice environment of the audio data collected by the slave device.

Another aspect of the present disclosure provides a device. The device includes a first device, a second device, and a third device. The first device obtains audio data collected by a slave device. The second device obtains contextual data corresponding to the slave device. The contextual data characterizes a voice environment of the audio data collected by the slave device. The third device obtains a recognition result of recognizing the audio data based on the contextual data.

Another aspect of the present disclosure provides a device. The device includes a communication interface; and a processor, operatively coupled to the communication interface. The processor, under a predetermined execution instruction, uses the communication interface to obtain: audio data collected by a slave device; contextual data corresponding to the slave device; and a recognition result of recognizing the audio data based on the contextual data. The contextual data characterizes a voice environment of the audio data collected by the slave device.

Other aspects of the present disclosure can be understood by those skilled in the art in light of the description, the claims, and the drawings of the present disclosure.

DETAILED DESCRIPTION

Reference will now be made in detail to examples of embodiments of the disclosure, which are illustrated in the accompanying drawings. Wherever possible, the same reference numbers will be used throughout the drawings to refer to the same or like parts. It is apparent that the described embodiments are some but not all of the embodiments of the present disclosure. Based on the disclosed embodiments, persons of ordinary skill in the art may derive other embodiments consistent with the present disclosure, all of which are within the scope of the present disclosure.

The present disclosure provides methods and devices for information processing.

Figure 1:
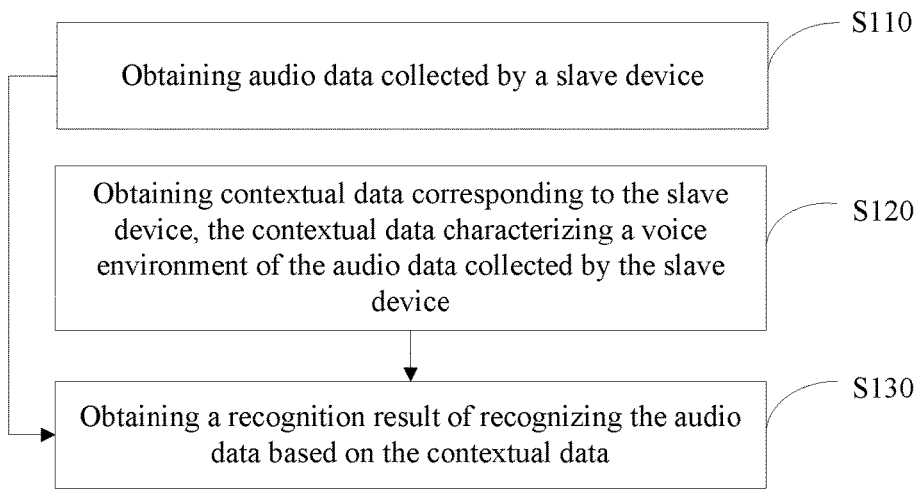
FIG. 1 illustrates an example of an information processing method according to some embodiments of the present disclosure.

FIG. 1 illustrates an example of an information processing method consistent with some embodiments of present disclosure. The example of the information processing method shown in FIG. 1 may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

The disclosed information processing method may be implemented by an electronic device. The electronic device may be connected to the slave device. The electronic device may be, for example, a desktop computer, a notebook computer, a server, or any computing device. The slave device may be an audio collecting device used for collecting audio data. In various embodiments, one or more slave devices may be included to implement the disclosed information processing method and discretely distributed at different locations.

The implementing subject of the disclosed information processing method may include any of the above-described electronic devices, for example, used as a master device; or may be a slave device itself. When the disclosed information processing method is implemented by a master device selected from the above-described electronic devices, in S110, the audio data may be received from a slave device. In the case when the disclosed information processing method is implemented by the slave device itself, the slave device may collect the audio data by itself.

In S120, contextual data may be obtained and used to characterize the voice environment of the audio data. When a user makes a voice interaction, voice content voiced by the user may be related to the voice environment. The voice environment may be used to characterize conditions and status of the speaker (or the user). The conditions and status of the speaker in turn determines the voice content. Such contextual data can clearly facilitate, e.g., in a voice recognition with corrections of homonym or non-standard pronunciation, to perform a selection from a plurality of entries mapped by a same audio data. Recognition accuracy may be improved.

In S130, the audio data can be recognized according to the contextual data. The contextual data may be used to reflect the probability of a homophone entry corresponding to one audio data. For example, a user may dine in a restaurant. The voice environment in such restaurant may be related to the dishes, drinks and restaurant services, as well as occupation-related content, for example. After the voice environment is determined, in a case that beverage data corresponds to two homophone entries, it has a higher probability that the homophone entry, that substantially matches with or is closer to the contextual data, is the user's voice content. This homophone entry substantially matching with or being closer to the contextual data, e.g., from the user's voice content, may then be selected as the recognition result. In this manner, accuracy of voice recognition may be improved. Of course, in a specific implementation process, the disclosed voice recognition is not limited to the above described recognition applications. As such, obtaining contextual data and using the contextual data as a reference for recognition may enhance the accuracy of the voice recognition.

In S130, voice recognition of an audio data based on the contextual data may be performed by the electronic device used for implementing the disclosed information processing method, or may be implemented by another device having recognition function, to which the disclosed electronic device may send the audio data and the contextual data. For example, a voice recognition server may be used as another device for performing remote voice recognition, and may send recognition results to the disclosed electronic device after the remote voice recognition. In other words, any suitable known method(s) of obtaining the recognition result in S130 may be included in the present disclosure without limitation.

In another embodiment, referring back to FIG. 1, an example of the information processing method may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

The disclosed information processing method can be implemented by various electronic devices that are connected to the slave device. The electronic devices may be, for example, a desktop computer, a notebook computer, a server, or any suitable computing device. The slave device may be an audio collecting device used for collecting audio data. In various embodiments, one or more slave devices may be included for implementing the disclosed method and may be discretely distributed at different locations.

Various methods of obtaining the contextual data can be used and encompassed in the present disclosure. The contextual data may include various compositions. In one embodiment, the contextual data may include, for example, use data, contextual parameters, contextual data, and/or other suitable data.

The use data may characterize a space for the slave device for collecting the audio data. For example, the audio data may be collected in a kitchen. The audio data inputted by the user and collected in the kitchen may include data of the user inquiring a recipe, data of inquiring beverage production, etc. As such, the use data of the space, e.g., kitchen space, may include location for making food and beverage. Apparently, a high probability is reflected in this space for sending collected audio data related to making food and beverage. As such, collected audio data may correspond to a number of options. In a case that one of these options is related to making food and beverage, while another one is not related to making the food and beverage, the one option related to the contextual data of making the food and beverage can be first selected as the recognition result.

Contextual parameters may be determined according to a frequency of occurrence of an entry of collected historical audio data that has relevance with a context in a historical collection period. For example, the activities happened in some certain places may usually be similar. For example, a conference room may be a place for discussing work. Different conference rooms belong to different departments. Based on this, by controlling operations of a voice system, voice recognition may be performed. In one embodiment, historical audio data collected in the historical collection period may be analyzed to provide probability of the contextual data corresponding to the dialogues and voice inputs frequently happened in a location of the device. For example, in a historical collection period, a large amount of voice inputs may be associated with chemical experiments. In this case, it is considered that dialogues related to chemical experiments may often occur at current location of the device. When next time a voice of "tongshi" is collected, according to the contextual data, it may be determined to select a recognition result having a greater relevance with the chemical experiments as the final recognition result to improve the recognition accuracy and success rate.

In one embodiment, a historical collection period may be a number of N days, for example, about one week, a half month, or M hours. The historical collection period may be one or more previous historical collection periods before a current collection period, and may have a continuous time point with the current time point or may be a time point (or moment) having an interval with the current time point. As such, based on the recognition result of the audio data collected frequently by the slave device, and a corresponding relationship with the contextual data, the context corresponding to the dialogue or voice input that often occurs surrounding the slave device may be determined. As such, recognition based on historical data collection may enhance correct rate of recognition results of current voice recognition.

Contextual data at an (n+1)th moment may be determined according to topic information mapped by the audio data collected at an (n)th moment, where n is an integer of 1 and greater. In voice content, adjacent audio data inputted one after another are usually relevant with each other. Such relevance may be reflected in the context. In one embodiment, the topic information can be used to reflect the context, corresponding to the contextual data. In one embodiment, according to the relevance between adjacent audio data inputted one after another, the topic information reflected in previous audio data may be determined as the contextual data at a current collection time to assist in recognizing the audio data of the current collection time. This may effectively improve the recognition accuracy.

In a specific embodiment, the (n)th moment (or time point) and the (n+1)th moment are two collection times continuously distributed with each other, or the audio data of the two collection times are two parts of audio data that the user inputs at one time. Usually audio data inputted separately by the user, due to different habits, pauses may appear in the audio data inputted separately by the user. Relevance between audio data collected separately having a long pause there-between may be less than the relevance between audio data collected separately with a short pause there-between. In one embodiment, audio data, having a pause time between the (n)th collection time and the (n+1)th collection time for collecting the audio data less than a pre-set pause time, may be regarded as two relevant parts of the audio data from a user's one-time input.

As such, contextual data may be determined by a dynamic relevance between inputted audio data to obtain contextual data with improved accuracy to improve voice recognition result.

In another embodiment, referring back to FIG. 1, an example of the information processing method may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

For example, in S110, the example of the information processing method may further include receiving, by a master device, the audio data sent from the slave device via a first connection mode.

In S120, the example of the information processing method may further include sending, via a second connection mode, the audio data and the contextual data to a server; and receiving, via the second connection mode, the recognition result returned from the server after the server recognizes the audio data and the contextual data. The second communication interface sends, via a second connection mode, the audio data and the contextual data to a server; and receives, via the second connection mode, the recognition result returned from the server after the server recognizes the audio data and the contextual data. A maximum communication distance of the first connection mode is less than a maximum communication distance of the second connection mode.

Figure 2:
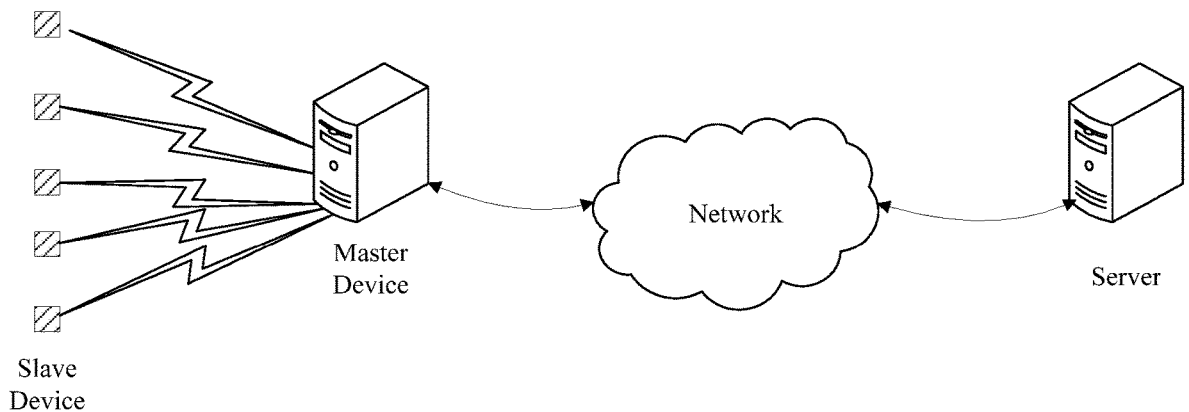
FIG. 2 illustrates an example of connections of a master device, a slave device, and a server according to some embodiments of the present disclosure.

In one embodiment, the electronic device for implementing the information processing method is a master device. FIG. 2 illustrates an example of connections of a master device, a slave device, and a server according to some embodiments of the present disclosure.

As shown in FIG. 2, the master device may have one end connected to a slave device and another end connected to the server. The master device may be used as an intermediate device between the slave device and the server. The master device is connected with the server, e.g., via the Internet. In other embodiments, a direct connection may be established between the master device and the server. As used herein, a direct connection means that there is no other electronic device included or connected between the master device and the server.

The first connection mode and the second connection mode are different from each other. The difference thereof may be embodied in the following aspects.

In one example, the transmitted signal type is different. For example, one signal may be a wired signal, while another signal may be a wireless signal. The first connection mode can transmit the wireless signal, while the second connection mode can transmit the wired signal. However, a maximum communication distance of the first connection mode may be less than a maximum communication distance of the second connection mode.

Of course, in some embodiments, both the first connection mode and the second connection mode are used to transmit a wireless signal. For example, the first connection mode may be used to transmit a WiFi signal, a Bluetooth signal, or an infrared signal, and the wireless signal transmitted by the second connection method may be a mobile data signal including the third generation (3G) mobile communication, the fourth generation (4G) mobile communication, or the fifth generation (5G) mobile communication, mobile data signal.

In another example, the transmitted signal encoding is different. For example, the first connection mode is used to transmit WiFi signal that complies with an encoding method corresponding to WiFi protocol, and the second connection is used to transmit mobile data signal with an encoding method corresponding to 3G, 4G, or 5G mobile communication protocol.

Regardless the differences between the first connection mode and the second connection mode, a maximum communication distance of the first connection mode is less than a maximum communication distance of the second connection mode. This is convenient for a remote server on a side of the master device in the network to obtain the recognition result.

In another embodiment, referring back to FIG. 1, an example of the information processing method may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

For example, in S110, the example of the information processing method may further include receiving the audio data from a first slave device among at least two slave devices.

Figure 3:
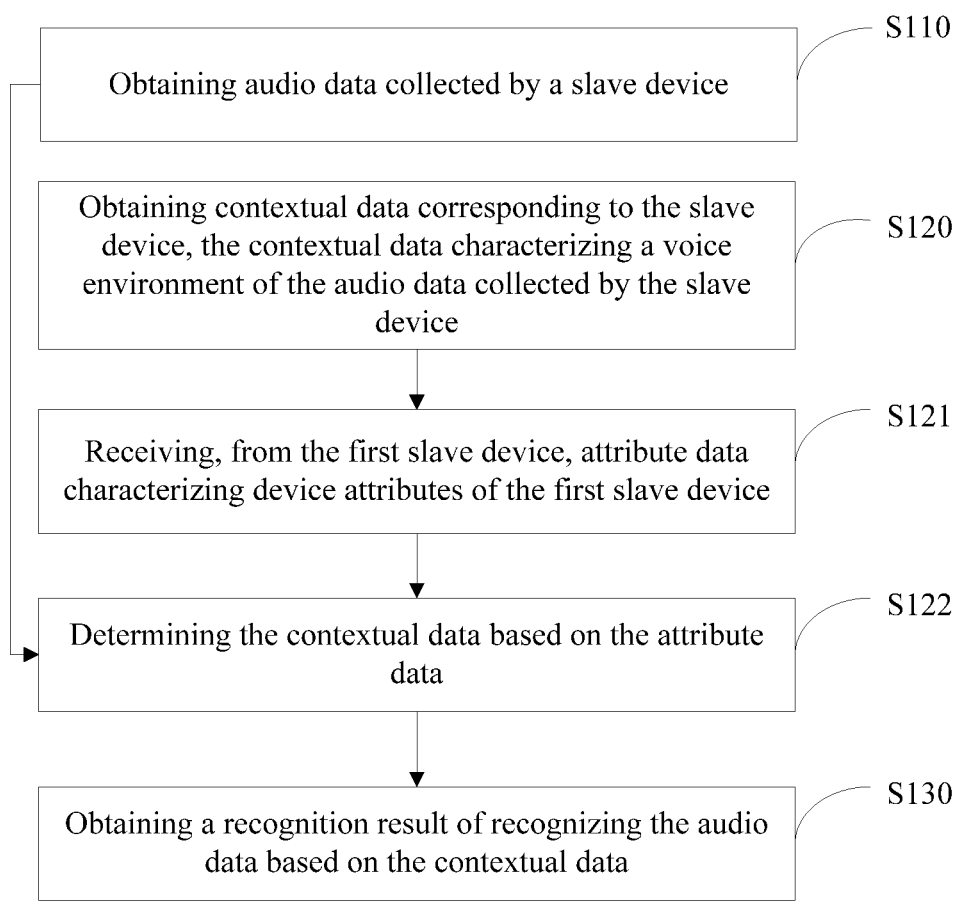
FIG. 3 illustrates another example of an information processing method according to some embodiments of the present disclosure.

As shown in FIG. 3, in S120, the example of the information processing method may further include: in S121, receiving, from the first slave device, attribute data characterizing device attributes of the first slave device; and in S122, determining the contextual data based on the attribute data.

In one embodiment, the audio data is received from one or P1 of a number of P slave devices, where p1 is a positive integer less than or equal to P. Therefore, the one or p1 electronic devices that send audio data to the master device (e.g., a device that implements the information processing method including S110 to S130) may be collectively referred to as the first slave device.

In one embodiment, in S120, attribute data is obtained, which characterizes the attribute data corresponding to the device attributes of the first slave device. The device attributes may include a device identifier such as a device number, a geographical location of the device, application environment data of the application environment of the device, and/or any suitable data for characterizing device attributes and features.

In one embodiment, the audio data may include data encoded in an audio format. The attribute data may include data encoded in a text format. When the audio data is decoded in S130, an audio decoding method may be used. The attribute data may be decoded using a normal text decoding format.

In one embodiment, the audio data and the contextual data may be sent together or may be sent separately. However, the audio data is a decoding target needs to be decoded, while the contextual data is data for providing a reference basis for decoding the audio data, which may be used directly as a decoding target.

Various implementations may be used in S122. In one example, the implementation in S122 may include: determining the contextual data, based on the attribute data and a predetermined correspondence relationship between the attribute data and the contextual data.

In one embodiment, the correspondence relationship may be pre-stored on the master device or on the server. For determining the contextual data, based on the correspondence relationship between the attribute data and the contextual data, the currently-obtained contextual data can be used to query the correspondence relationship to thus determine the contextual data. The implementation can be simplified.

For example, the implementation in S121 may include: receiving, from the first slave device, device identification data of the first slave device. The device identification data herein may include any suitable device information that can be used to uniquely identify the slave device in the current communication system, including, for example, a device identifier such as a device number, a device name, etc. The implementation in S122 may include: querying a correspondence relationship between the device identification data and the contextual data to determine the contextual data corresponding to the first slave device.

In another example, the implementation in S121 may include: receiving, from the first slave device, the location data where the first slave device is located. The implementation in S122 may include: querying the correspondence relationship between the location data and the contextual data to determine the contextual data corresponding to the first slave device.

The disclosed correspondence relationships may be preset, for example, pre-configured based on user's input, or obtained by dynamic learning of the master device, the slave device, and/or the server. For example, the correspondence relationships may be determined by analyzing historical audio data collected at historical time points of the first slave device. In one embodiment, a process for obtaining the correspondence relationship between device attribute and contextual data may include: analyzing an (m1)th recognition result corresponding to the audio data collected by the first slave device at the (m1)th moment; determining, based on the (m1)th recognition result, contextual data corresponding to the first slave device; and establishing the correspondence relationship between the device attribute of the first slave device and the contextual data. The established correspondence relationship may be used to provide a basis for obtaining contextual data at (m2)th time point, which is later than the first (m1)th time point.

Of course, the disclosed correspondence relationships may be obtained by any suitable known manner and are not limited herein in any manner.

In another example, the implementation in S121 may include: receiving, from the first slave device, the contextual data corresponding to the first slave device. The implementation in S122 may include: determining, based on the received contextual data, the current contextual data corresponding to the first slave device.

In one embodiment, corresponding contextual data may be directly pre-stored on the first slave device. Thereafter, when sending the audio data from the device to a corresponding master device, the contextual data stored locally may be found and sent to the first slave device to facilitate the voice recognition of the master device or the server. Of course, in another embodiment, the contextual data may be stored directly as device attribute of the slave device.

In this manner, a method for obtaining the contextual data based on attribute data sent from a device is provided, which may provide high accuracy of voice recognition and may simplify the implementation.

In another embodiment, referring back to FIG. 1, an example of the information processing method may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

The implementation in S130 may include: when the audio data contains one or more homophone entries corresponding to a plurality of recognition results, selecting a recognition result matched with the contextual data as a final recognition result of the one or more homophone entries.

For example, the detected voice data may include phonetic data. For homonyms, for example, a phonetic symbol may correspond to different Chinese characters having different meanings, those Chinese characters that match with the contextual data may be selected as the final recognition result. As such, the probability that "tongshi" may be recognized as "copper stone" in a chemical lab is greater than the probability of being recognized as "colleague" in a normal office.

By obtaining the contextual data, the accuracy of recognizing homonyms and correct rate of recognition can be improved.

In another embodiment, referring back to FIG. 1, an example of the information processing method may include the following: in S110: obtaining audio data collected by a slave device; in S120: obtaining contextual data corresponding to the slave device, the contextual data characterizing a voice environment of the audio data collected by the slave device; and in S130: obtaining a recognition result of recognizing the audio data based on the contextual data.

The implementation in S130 may include: when correcting the recognition result of the audio data, selecting a correction result matched with the contextual data as a final recognition result of the audio data.

Some people may have accent in voice pronunciation, which may cause incorrect pronunciation. To improve the correct rate in recognition, correction may be performed on recognition result. In this case, correction results may also involve a number of different entries having different meanings. Suitable selection may need to be made. In one embodiment, the correction result that matches with the contextual data may be selected as the final recognition result, which may enhance the correct rate of the recognition.

Figure 4:
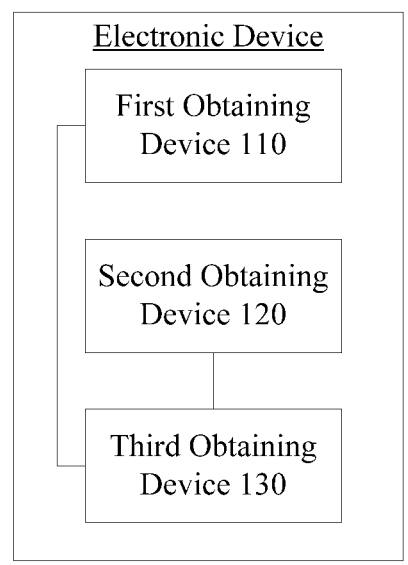
FIG. 4 illustrates an example of an electronic device according to some embodiments of the present disclosure.

In another embodiment, referring to FIG. 4, an example of an electronic device may provide a first device such as a first obtaining device 110 for obtaining audio data collected by a slave device; a second device such as a second obtaining device 120 for obtaining contextual data corresponding to the slave device; and a third device such as a third obtaining device 130 for obtaining a recognition result of recognizing the audio data based on the contextual data. The contextual data characterizes a voice environment of the audio data collected by the slave device.

The electronic device described herein may include various electronic devices such as notebook computers, desktop computers, mobile phones, or any suitable computing device. The first obtaining device 110, the second obtaining device 120, and the third obtaining device 130 may correspond to a processor and a processing circuit. The processor may include, for example, a central processing unit (CPU), a microprocessor (MCU), a digital signal processor (DSP), a programmable array, an application processor (AP), etc. The processing circuit may include a specific integrated circuit or the like, capable of performing the above-described functions by executing predetermined commands/instructions/programs accordingly.

Of course, the first obtaining device 110, the second obtaining device 120, and the third obtaining device 130 may correspond to communication interface(s) to receive the audio data, the contextual data, and/or the recognition result, from other devices. In short, the recognition result may be obtained via the contextual data, and the recognition result may be obtained according to the contextual data. Recognition accuracy may be improved. The electronic device provided by the present disclosure can perform the technical solution provided in any of the above-described information processing methods.

Figure 5:
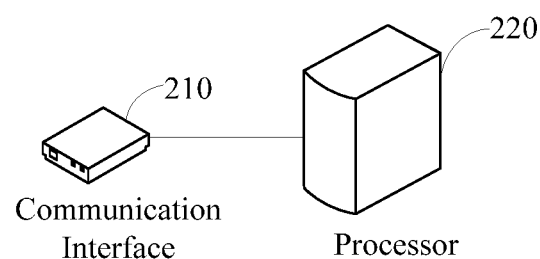
FIG. 5 illustrates another example of an electronic device according to some embodiments of the present disclosure.

In one embodiment, referring to FIG. 5, the present disclosure may provide an example of an electronic device including a communication interface 210 and a processor 220 operatively coupled to the communication interface 210.

The processor 220, under a predetermined execution instruction, self-obtains or uses the communication interface 210 to obtain: audio data collected by a slave device; contextual data corresponding to the slave device; and a recognition result of recognizing the audio data based on the contextual data. The contextual data characterizes a voice environment of the audio data collected by the slave device.

In one embodiment, the wireless interface may include a wired interface or a wireless interface. The wired interface may include a cable interface or an optical cable interface. The wireless interface may include various wireless communication interfaces, such as WiFi, infrared, Bluetooth, etc. The communication interface communicates with the processor 220 via an internal communication interface such as a data bus. The data bus may include a PCI bus, an IIC bus, etc. The electronic device of the present disclosure obtains the contextual data and obtains the recognition result of the audio data based on the contextual data. Accuracy of recognition result may be improved.

The contextual data may be any data indicating a voice environment of the collected audio data. Various methods of obtaining the contextual data can be used and encompassed in the present disclosure. The contextual data may include various compositions. In one embodiment, the contextual data may include use data, contextual parameters, contextual data, and/or other suitable data.

For example, use data characterizes a space for the slave device for collecting the audio data.

In another example, contextual parameters are determined according to a frequency of occurrence of an entry of collected historical audio data that has relevance with a context within a historical collection period.

In an additional example, contextual data at an (n+1)th moment is determined according to topic information mapped by the audio data collected at an (n)th moment, where n is an integer of 1 and greater.

The use data may be determined according to the spatial use of the space of the slave device from which the audio data is collected. The contextual parameters and contextual data at a time point may be determined according to the audio data previously acquired by the slave device through various learning algorithms. The learning algorithms used herein may include a vector machine learning algorithm, a neural network learning algorithm, etc. Any suitable data may be included in the contextual data and may be encompassed herein according to various embodiments of the present disclosure without limitation.

In another embodiment, referring back to FIG. 5, the present disclosure may provide an example of an electronic device including a communication interface 210 and a processor 220 operatively coupled to the communication interface 210.

The processor 220, under a predetermined execution instruction, self-obtains or uses the communication interface to obtain: audio data collected by a slave device; contextual data corresponding to the slave device; and a recognition result of recognizing the audio data based on the contextual data. The contextual data characterizes a voice environment of the audio data collected by the slave device.

The communication interface 210 includes a first communication interface and a second communication interface. The first communication interface is different from the second communication interface.

The first communication interface receives the audio data sent from the slave device via a first connection method. The second communication interface sends, via a second connection mode, the audio data and the contextual data to a server; and receives, via the second connection mode, the recognition result returned from the server after the server recognizes the audio data and the contextual data. A maximum communication distance of the first connection mode is less than a maximum communication distance of the second connection mode.

The electronic device provided by the present disclosure may be an intermediate device between a slave device and a server. The electronic device may establish a connection with a slave device via the first communication interface to acquire audio data in a first connection mode. The electronic device may also use a second communication interface to connect to the server to send the acquired contextual data and audio data to the server in a second connection mode and to obtain the recognition result from the server. Of course, in certain embodiments, the processor of the electronic device may itself perform voice recognition according to the contextual data and the audio data to obtain the recognition result.

In some embodiments, the electronic device provided by the present disclosure may be used as the master device, e.g., as shown in FIG. 2, where the first communication interface is connected to the slave device, and the second communication interface is connected to the server shown in FIG. 2.

In another embodiment, referring back to FIG. 5, the present disclosure may provide an example of an electronic device including a communication interface 210 and a processor 220 coupled to the communication interface 210.

The processor 220, under a predetermined execution instruction, self-obtains or uses the communication interface to obtain: audio data collected by a slave device; the contextual data corresponding to the slave device; and a recognition result of recognizing the audio data based on the contextual data. The contextual data characterizes a voice environment of the audio data collected by the slave device.

The communication interface 210 is for receiving the audio data from a first slave device among at least two slave devices; and receiving, from the first slave device, attribute data characterizing device attributes of the first slave device. The processor 220 is for determining the contextual data based on the attribute data.

In one embodiment, the electronic device may receive the audio data from the first slave device and receive the attribute data from the first slave device. The attribute data may characterize the attribute characteristics of the slave device and may be the contextual data of the audio data directly collected from the first slave device, and/or may be a correspondence relationship with the contextual data.

The electronic device provided by the present disclosure may be used to improve correct rate and accuracy of the recognition result with simplified implementation and simplified structure.

In some embodiments, the processor 220 may be for determining the contextual data, based on the attribute data and a predetermined correspondence relationship between the attribute data and the contextual data. For example, the communication interface 210 may be for receiving, from the first slave device, device identification data of the first slave device. The device identification data herein may include any suitable device information that can be used to uniquely identify the slave device in the current communication system, including, for example, a device identifier such as a device number, a device name, etc. The processor 220 may be for querying a correspondence relationship between the device identification data and the contextual data to determine the contextual data corresponding to the first slave device. In another example, the communication interface 210 may be for receiving, from the first slave device, the location data where the first slave device is located; and the processor 220 may be for querying the correspondence relationship between the location data and the contextual data to determine the contextual data corresponding to the first slave device.

In addition, such correspondence relationship may be pre-stored in advance in the storage medium of the electronic device. The storage medium may be configured within or outside the electronic device and may be connected to the processor via respective internal communication interfaces. Of course, the disclosed correspondence relationships may be obtained by a dynamic learning of the electronic device based on the audio data obtained at historical time points. For example, the correspondence relationships may be determined by analyzing historical audio data collected at historical time points of the first slave device. The processor 220 may be for analyzing an (m1)th recognition result corresponding to the audio data collected by the first slave device at the (m1)th moment; determining, based on the (m1)th recognition result, contextual data corresponding to the first slave device; and establishing the correspondence relationship between the device attribute of the first slave device and the contextual data. The established correspondence relationship may be used to provide a basis for obtaining contextual data at (m2)th time point, which is later than the first (m1)th time point.

In other embodiments, the communication interface 210 may be directly used for receiving, from the first slave device, the contextual data corresponding to the first slave device. The processor 220 may be for determining, based on the received contextual data, the current contextual data corresponding to the first slave device. In one embodiment, corresponding contextual data may be directly pre-stored on the first slave device. Thereafter, when sending the audio data from the device to the corresponding master device, the contextual data stored locally may be found and sent to the first slave device to facilitate the voice recognition of the master device or the server. Of course, in another embodiment, the contextual data may be stored directly as device attribute of the slave device.

Of course, any suitable electronic device may be used herein without limiting the scope of present disclosure. The electronic device provided herein may provide high recognition accuracy.

In another embodiment, referring back to FIG. 5, the present disclosure may provide an example of an electronic device including a communication interface 210 and a processor 220 coupled to the communication interface 210.

The processor 220, under a predetermined execution instruction, self-obtains or uses the communication interface to obtain: audio data collected by a slave device; the contextual data corresponding to the slave device; a recognition result of recognizing the audio data based on the contextual data. The contextual data characterizes a voice environment of the audio data collected by the slave device.

When the audio data contains one or more homophone entries corresponding to a plurality of recognition results, the processor 220 may select a recognition result matched with the contextual data as a final recognition result of the one or more homophone entries.

The processor 220 described herein may be used for recognizing homophone entries based on contextual data of voice data and selecting an recognition result matched with the contextual data as the final recognition result. Correct rate of recognition may be improved.

In one embodiment, when selecting the recognition result from two or more recognition results, the processor 220 selects the recognition result that mostly matches with the contextual data or that has relevance or a closest relevance with the contextual data as the final recognition result.

In another embodiment, referring back to FIG. 5, the present disclosure may provide an example of an electronic device including a communication interface 210 and a processor 220 coupled to the communication interface 210.

The processor 220, under a predetermined execution instruction, self-obtains or uses the communication interface to obtain: audio data collected by a slave device; the contextual data corresponding to the slave device; a recognition result of recognizing the audio data based on the contextual data. The contextual data characterizes a voice environment of the audio data collected by the slave device.

When correcting the recognition result of the audio data, the processor 220 is for selecting a correction result matched with the contextual data as a final recognition result of the audio data.

In the case of voice correction, the correction may be made to be correction A or correction B according to the user's usual pronunciation habit. In this case, based on the contextual data, one of the correction A and correction B that mostly matches with the contextual data may be selected as the final recognition result.

In one embodiment, selecting a correction result matched with the contextual data may include selecting a correction result having relevance or closely associated with the context environment corresponding to the contextual data as the final recognition result.

An example of an information processing method may include: recording a recognition result of an acquisition engine (or a collecting engine).

Because users may often use the acquisition engine in a specific location (e.g., a kitchen), a specific scene (e.g., cooking), the user's use of the acquisition engine is necessarily related to the location and the scene being used. By recording the user's recognition result, the occurrence of the frequency and relevance of entries in the recognition result may be counted. As such, the location and the scene that a user uses the acquisition engine may be known. The acquisition engine can correspond to a variety of audio acquisition/collecting devices including, for example, microphone, etc. By identifying the user's location and voice scenes, electronic device may in turn be able to optimize recognition results. For example, the electronic device may predict that the user is using the kitchen, and the voice category of the recognition result may most likely include semantics related to kitchen and food, in most cases.

As used herein, the location and voice scenes are examples of the contextual environments characterized by the contextual data.

In this manner, by the disclosed information processing methods and devices, before performing voice recognition of an audio data, contextual data corresponding to the audio data can be obtained. When performing the voice recognition, based on the contextual data, a recognition result matched with a voice environment characterized by the contextual data can be selected as a final recognition result. This may avoid voice recognition performed solely based on audio data. The correct rate and accuracy of the voice recognition can be improved.

It should be appreciated by those skilled in this art that the embodiments of this disclosure may be provided in the form of a method, device, system or computer program product. Therefore, the embodiments of this disclosure may be realized by complete hardware embodiments, complete software embodiments, or software-hardware combined embodiments. Moreover, this disclosure may be realized in the form of a computer program product that is applied to one or more computer-usable storage devices (including, but not limited to disk memory, CD-ROM or optical memory) in which computer-usable program codes are contained.

This disclosure is illustrated with reference to the flow chart and/or the block diagrams of the method, device (system) and computer program product according to the embodiments of this disclosure. It should be appreciated that each flow in the flow chart and/or each block in the block diagram and/or the combination of the flows in the flow chart and the blocks in the block diagram may be realized by computer program instructions. These computer program instructions may be provided to a general-purpose computer, a special purpose computer, an embedded processor or processors of other programmable data processing devices to generate a machine which makes the instructions executed by the processors of the computers, or the processors of other programmable data processing devices generate a device for realizing the functions specified in one or more flows of the flow chart or one or more blocks in the block diagram.

It should be understood that actions described in various methods of the present disclosure may be carried out in order as shown, or alternately, in a different order. Therefore, the order of the actions illustrated should not be construed as limiting the scope of the present disclosure. In addition, certain actions may be performed simultaneously.

In various embodiments, the disclosed unit/devices can be configured in one device or configured in multiple devices as desired. The units/devices disclosed herein can be integrated in one or multiple units/devices. Each of them can be divided into one or more sub-units/devices, which can be recombined in any manner. In addition, the units/devices can be directly or indirectly coupled or otherwise communicated with each other, e.g., by suitable interfaces.

The coupling, or direct coupling, or communication connection between the disclosed components may use one or more interfaces. The indirect coupling or communication connection between units or devices may be electrically, mechanically or in other suitable manner.

These computer program instructions may also be stored in a computer-readable memory which is capable of guiding a computer or another programmable data processing device to work in a given manner, thereby enabling the instructions stored in the computer-readable memory to generate a product including an instruction device for realizing the functions specified in one or more flows of the flow chart or one or more blocks in the block diagram.

These computer program instructions may also be loaded to a computer or other programmable data processing devices to execute a series of operations thereon to generate the processing realized by the computer so that the instructions executed by the computer or other programmable data processing devices offer the steps for realizing the functions specified in one or more flows of the flow chart or one or more blocks in the block diagram.

In the present disclosure, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Various embodiments of the present specification are described in a progressive manner, in which each embodiment focusing on aspects different from other embodiments, and the same and similar parts of each embodiment may be referred to each other. Since the disclosed electronic device corresponds to the disclosed information processing method, the description of the disclosed electronic device is relatively simple, and the correlation may be referred to the method section.

The description of the disclosed embodiments is provided to illustrate the present disclosure to those skilled in the art. Various modifications to these embodiments will be readily apparent to those skilled in the art, and the generic principles defined herein may be applied to other embodiments without departing from the spirit or scope of the disclosure. Thus, the present invention is not intended to be limited to the embodiments shown herein but is to be accorded the widest scope consistent with the principles and novel features disclosed herein.

What is claimed is:

1. A method, comprising:
   obtaining, using a processor, audio data collected by a slave device;
   obtaining, using the processor, contextual data characterizing a voice environment where the audio data is collected by the slave device, the contextual data including data characterizing a space where the slave device is located and including contextual parameters generated using historical audio data collected by the slave device according to a frequency of occurrence of a voice input entry in the historical audio data that has a relevance with a context in a historical collection period; and obtaining, using the processor, a recognition result of recognizing the audio data based on the contextual data, including:
  determining a function of the space where the slave device is located according to the contextual data, the function indicating an intended use of the space; and
  recognizing the audio data based on the function of the space to obtain the recognition result, the recognition result belonging to a topic associated with the intended use of the space,
wherein obtaining the contextual data further comprises:
  determining the contextual data at (n+1)th moment according to topic information mapped by audio data collected at (n)th moment, n being a positive integer,
  wherein a pause time between the (n)th moment of collecting the audio data and the (n+1)th moment is less than a pre-set pause time.

2. The method according to claim 1, wherein:
obtaining the audio data collected by the slave device includes: receiving, by a master device, the audio data sent from the slave device via a first connection mode; and
obtaining the contextual data corresponding to the slave device includes:
  sending, via a second connection mode, the audio data and the contextual data to a server; and receiving, via the second connection mode, the recognition result returned from the server after the server recognizes the audio data and the contextual data,
  wherein a maximum communication distance of the first connection mode is less than a maximum communication distance of the second connection mode, the first connection mode being a local network transmission mode, and the second connection mode being a mobile data signal transmission mode.

3. The method according to claim 1, wherein:
obtaining the contextual data corresponding to the slave device includes: receiving, from the slave device among at least two slave devices, attribute data characterizing device attributes of the slave device, and determining the contextual data based on the attribute data.

4. The method according to claim 3, wherein determining the contextual data based on the attribute data includes:
  determining the contextual data, based on the attribute data and a predetermined correspondence relationship between the attribute data and the contextual data.

5. The method according to claim 1, wherein obtaining the recognition result of recognizing the audio data based on the contextual data further includes:
  for the audio data containing one or more homophone entries corresponding to a plurality of recognition results, selecting a recognition result matched with the contextual data as a final recognition result of the one or more homophone entries.

6. The method according to claim 1, wherein obtaining the recognition result of recognizing the audio data based on the contextual data further includes:
  for correcting the recognition result of the audio data, selecting a correction result matched with the contextual data as a final recognition result of the audio data.

7. A device, comprising:
a first device, configured to obtain audio data collected by a slave device;
a second device, configured to obtain contextual data characterizing a voice environment where the audio data is collected by the slave device, the contextual data including data characterizing a space where the slave device is located and including contextual parameters generated using historical audio data collected by the slave device according to a frequency of occurrence of a voice input entry in the historical audio data that has a relevance with a context in a historical collection period; and
a third device, configured to obtain a recognition result of recognizing the audio data based on the contextual data, by:
  determining a function of the space where the slave device is located according to the contextual data, the function indicating an intended use of the space; and
  recognizing the audio data based on the function of the space to obtain the recognition result, the recognition result belonging to a topic associated with the intended use of the space,
wherein the second device is further configured to:
  determine the contextual data at (n+1)th moment according to topic information mapped by audio data collected at (n)th moment, n being a positive integer,
  wherein a pause time between the (n)th moment of collecting the audio data and the (n+1)th moment is less than a pre-set pause time.

8. The device according to claim 7, wherein:
the first device receives the audio data from the slave device among at least two slave devices; and
the second device receives, from the slave device, attribute data characterizing device attributes of the slave device, and determines the contextual data based on the attribute data.

9. The device according to claim 8, wherein:
the second device determines the contextual data, based on the attribute data and a predetermined correspondence relationship between the attribute data and the contextual data.

10. The device according to claim 8, wherein:
for the audio data containing one or more homophone entries corresponding to a plurality of recognition results, the third device selects a recognition result matched with the contextual data as a final recognition result of the one or more homophone entries.

11. A device, comprising:
a communication interface; and
a processor, operatively coupled to the communication interface,
wherein:
the processor, under a predetermined execution instruction, uses the communication interface to:
  obtain audio data collected by a slave device;
  obtain contextual data characterizing a voice environment where the audio data is collected by the slave device, the contextual data including data characterizing a space where the slave device is located and including contextual parameters generated using historical audio data collected by the slave device according to a frequency of occurrence of a voice input entry in the historical audio data that has a relevance with a context in a historical collection period; and
  obtain a recognition result of recognizing the audio data based on the contextual data, by:

determining a function of the space where the slave device is located according to the contextual data, the function indicating an intended use of the space; and recognizing the audio data based on the function of the space to obtain the recognition result, the recognition result belonging to a topic associated with the intended use of the space;

wherein the processor is configured to:

determine the contextual data at (n+1)th moment according to topic information mapped by audio data collected at (n)th moment, n being a positive integer, wherein a pause time between the (n)th moment of collecting the audio data and the (n+1)th moment is less than a pre-set pause time.

12. The device according to claim 11, wherein:

the communication interface includes a first communication interface and a second communication interface different from the first communication interface, wherein:

the first communication interface receives the audio data sent from the slave device via a first connection method; and the second communication interface sends, via a second connection mode, the audio data and the contextual data to a server, and receives, via the second connection mode, the recognition result returned from the server after the server recognizes the audio data and the contextual data, wherein a maximum communication distance of the first connection mode is less than a maximum communication distance of the second connection mode.

13. The device according to claim 11, wherein:

the communication interface receives the audio data from the slave device among at least two slave devices; and receives, from the slave device, attribute data characterizing device attributes of the slave device; and the processor determines the contextual data based on the attribute data.

14. The device according to claim 13, wherein the processor further:

determines the contextual data, based on the attribute data and a predetermined correspondence relationship between the attribute data and the contextual data.

15. The device according to claim 11, wherein the processor further:

when the audio data contains one or more homophone entries corresponding to a plurality of recognition results, selects a recognition result matched with the contextual data as a final recognition result of the one or more homophone entries.

16. The device according to claim 11, wherein the processor further:

when correcting the recognition result of the audio data, selects a correction result matched with the contextual data as a final recognition result of the audio data.

17. The method according to claim 1, wherein:

the space is selected from at least one of a kitchen or conference rooms of different departments.

18. The method according to claim 1, wherein:

the space is a kitchen and the topic associated with the intended use of the space is food and beverage; or the space is a conference room of a chemical department, and the topic associated with the intended use of the space is chemistry.

* * * * *